(12) United States Patent
Blanco et al.

(10) Patent No.: US 11,514,031 B2
(45) Date of Patent: Nov. 29, 2022

(54) PRODUCT NAVIGATOR

(71) Applicant: The Travelers Indemnity Company, Hartford, CT (US)

(72) Inventors: Monica N. Blanco, Plantsville, CT (US); Sarah C. Strange, East Hampton, CT (US); Hayden Crumrine, Bristol, CT (US); Brett Mortimer, Bloomfield, CT (US); Venkata N. Chikyala, Elkridge, MD (US); Frederica K. Werkheiser, Parkton, MD (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 2506 days.

(21) Appl. No.: 14/527,926

(22) Filed: Oct. 30, 2014

(65) Prior Publication Data
US 2016/0125024 A1 May 5, 2016

(51) Int. Cl.
| G06F 16/00 | (2019.01) |
| G06F 16/242 | (2019.01) |
| G06F 16/248 | (2019.01) |
| G06Q 10/06 | (2012.01) |
| G06Q 40/08 | (2012.01) |

(52) U.S. Cl.
CPC ........ *G06F 16/2423* (2019.01); *G06F 16/248* (2019.01); *G06Q 10/06* (2013.01); *G06Q 40/08* (2013.01)

(58) Field of Classification Search
CPC ... G06F 16/2423; G06F 16/248; G06Q 10/06; G06Q 40/08

USPC ........................................................ 707/772
See application file for complete search history.

(56) References Cited

U.S. PATENT DOCUMENTS

| 6,216,130 B1 | 4/2001 | Hougaard et al. |
| 6,604,080 B1 | 8/2003 | Kern |
| 8,626,538 B1 | 1/2014 | Kilpatrick, II et al. |

(Continued)

OTHER PUBLICATIONS

Stevebizlib (Steve Cramer, UNCG), Identifying NAICS (Industry) Codes. Online video clip. YouTube. Jul. 2, 2013. Web. Sep. 19, 2018. (Year: 2013).*

(Continued)

*Primary Examiner* — Alexandria Y Bromell
(74) *Attorney, Agent, or Firm* — Cantor Colburn LLP

(57) ABSTRACT

A system for a product navigator is provided. The system receives a search string at a business-type classification interface on an interactive user display. A search type associated with the search string may be determined based on a search type selection from a plurality of search types. A search of a database may be initiated for an entry matching the search string according to the search type, where the entry has corresponding business-type classification data including a brief classification description, an extended classification description, and an associated classification code. The brief classification description and the extended classification description may be output on the interactive user display based on receiving the corresponding business-type classification data from the database. A confirmation request may be presented on the interactive user display and a classification code field populated with the associated classification code based on receiving an affirmative response to the confirmation request.

23 Claims, 15 Drawing Sheets

(56) References Cited

U.S. PATENT DOCUMENTS

| | | |
|---|---|---|
| 8,712,807 B2 | 4/2014 | Walker et al. |
| 8,719,063 B1 | 5/2014 | Wade et al. |
| 2002/0165805 A1 | 11/2002 | Varga et al. |
| 2003/0179236 A1 | 9/2003 | Good et al. |
| 2003/0229581 A1 | 12/2003 | Green et al. |
| 2005/0081152 A1 | 4/2005 | Commarford et al. |
| 2005/0144114 A1 | 6/2005 | Ruggieri et al. |
| 2005/0154617 A1 | 7/2005 | Ruggieri et al. |
| 2008/0059220 A1 | 3/2008 | Roth et al. |
| 2008/0114789 A1 | 5/2008 | Wysham |
| 2008/0140616 A1 | 6/2008 | Encina et al. |
| 2009/0228301 A1 | 9/2009 | Youngblood et al. |
| 2009/0300046 A1 | 12/2009 | Abouyounes |
| 2010/0094666 A1 | 4/2010 | Pendergrass et al. |
| 2010/0154005 A1 | 6/2010 | Baxter |
| 2010/0169365 A1 | 7/2010 | Chupp et al. |
| 2011/0010378 A1 | 1/2011 | Dukes |
| 2011/0077977 A1 | 3/2011 | Collins et al. |
| 2011/0161182 A1 | 6/2011 | Racco |
| 2012/0158289 A1 | 6/2012 | Brush et al. |
| 2013/0290200 A1 | 10/2013 | Singhal et al. |
| 2014/0039323 A1 | 2/2014 | Spector |
| 2014/0067737 A1 | 3/2014 | Kapadia et al. |
| 2014/0173684 A1 | 6/2014 | McQuay et al. |
| 2014/0207789 A1 | 7/2014 | Lee et al. |
| 2014/0244309 A1 | 8/2014 | Francois |
| 2014/0279599 A1 | 9/2014 | Bruno et al. |
| 2014/0330594 A1 | 11/2014 | Roberts et al. |
| 2015/0032479 A1 | 1/2015 | Schembari et al. |
| 2015/0067819 A1* | 3/2015 | Shribman ............... H04L 67/02 726/12 |
| 2015/0071268 A1 | 3/2015 | Kennedy et al. |
| 2015/0186467 A1 | 7/2015 | Voonna |
| 2015/0331903 A1 | 11/2015 | Blanco et al. |
| 2016/0125025 A1 | 5/2016 | Blanco et al. |
| 2016/0125422 A1 | 5/2016 | Blanco et al. |

OTHER PUBLICATIONS

Referencegroup. "ReferenceUSA SIC and NAICS code searches." Online video clip. YouTube. Dec. 30, 2020. Web. Sep. 19, 2018. 2010.*

Stevebizlib (Steve Cramer, UNCG). "Identifying NAICS (Industry) Codes (2013)." Online video clip. YouTube. Jul. 2, 2013. Web. Sep. 19, 2018 (Year: 2013).*

Referencegroup. "ReferenceUSA SIC and NAICS code searches." Online video clip. YouTube. Dec. 30, 2010. Web. Sep. 19, 2018 (Year: 2010).*

"The Hartford Introduces Web-Based Quoting and Submission Tool for Small Commercial Insurance" URL: http://hig.client.shareholder.com/releasedetail.cfm?releaseid=209383 retrieved from the internet: Oct. 20, 2014. 2 pages.

U.S. Appl. No. 14/527,964 Final Office Action dated Oct. 26, 2017, 18 pages.

U.S. Appl. No. 14/528,006 Final Office Action, dated Aug. 11, 2017, 30 pages.

U.S. Appl. No. 14/528,006 Non-Final Office Action dated Nov. 30, 2017, 14 pages.

U.S. Appl. No. 14/280,794 Non-Final Office Action dated Jul. 28, 2016, 17 pages.

Insurance Requirements & Regulations by State; Advanced Insurance Management LLC "AIM".; Jun. 11, 2005, 35 pages.

U.S. Appl. No. 14/527,964 Non-Final Office Action dated Jan. 20, 2017, 62 pages.

U.S. Appl. No. 14/528,006 Non-Final Office Action dated Jan. 11, 2017, 27 pages.

U.S. Appl. No. 14/280,794 Notice of Allowance dated Dec. 7, 2016, 11 pages.

U.S. Appl. No. 14/527,964 Non-Final Office Action dated Jun. 15, 2018, 25 pages.

* cited by examiner

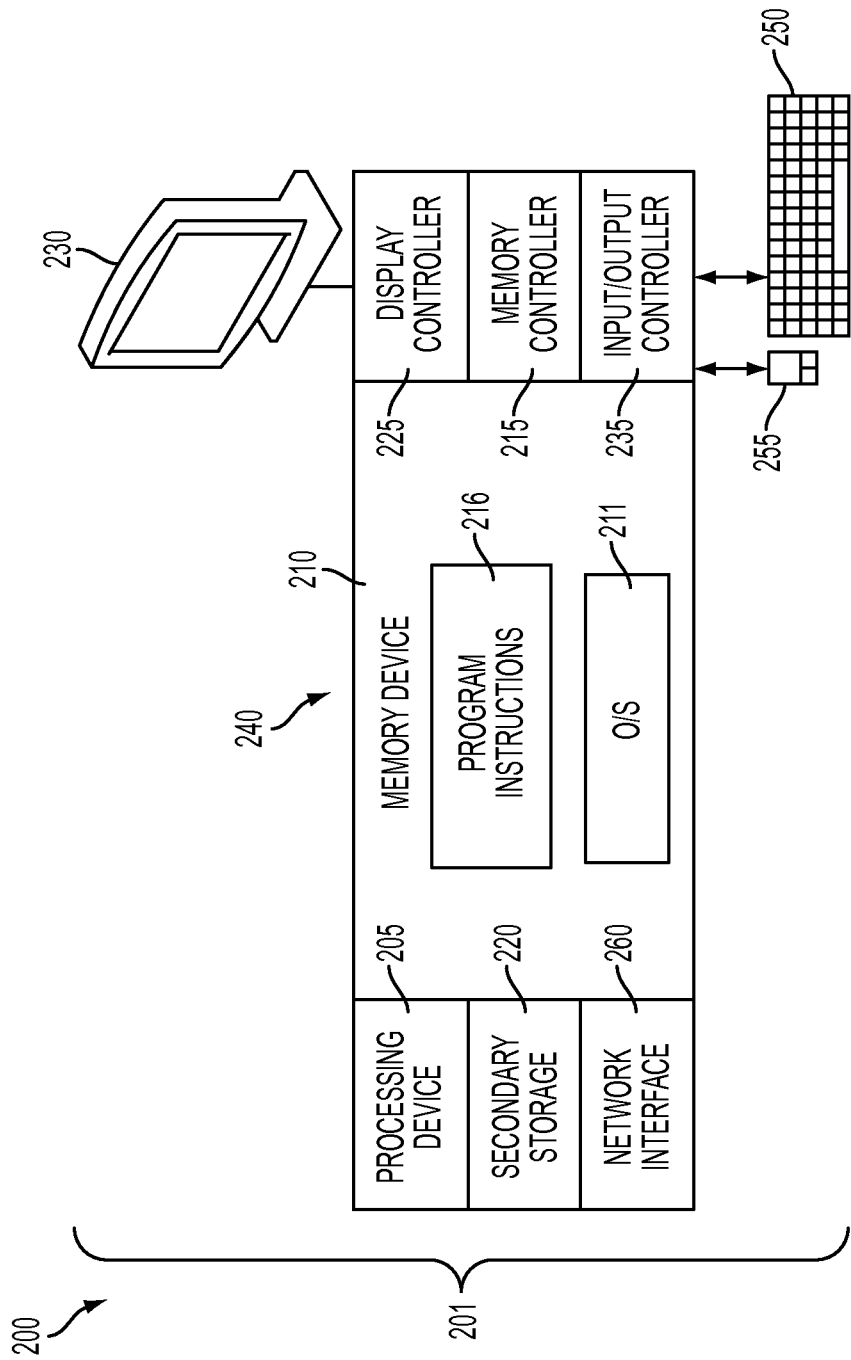

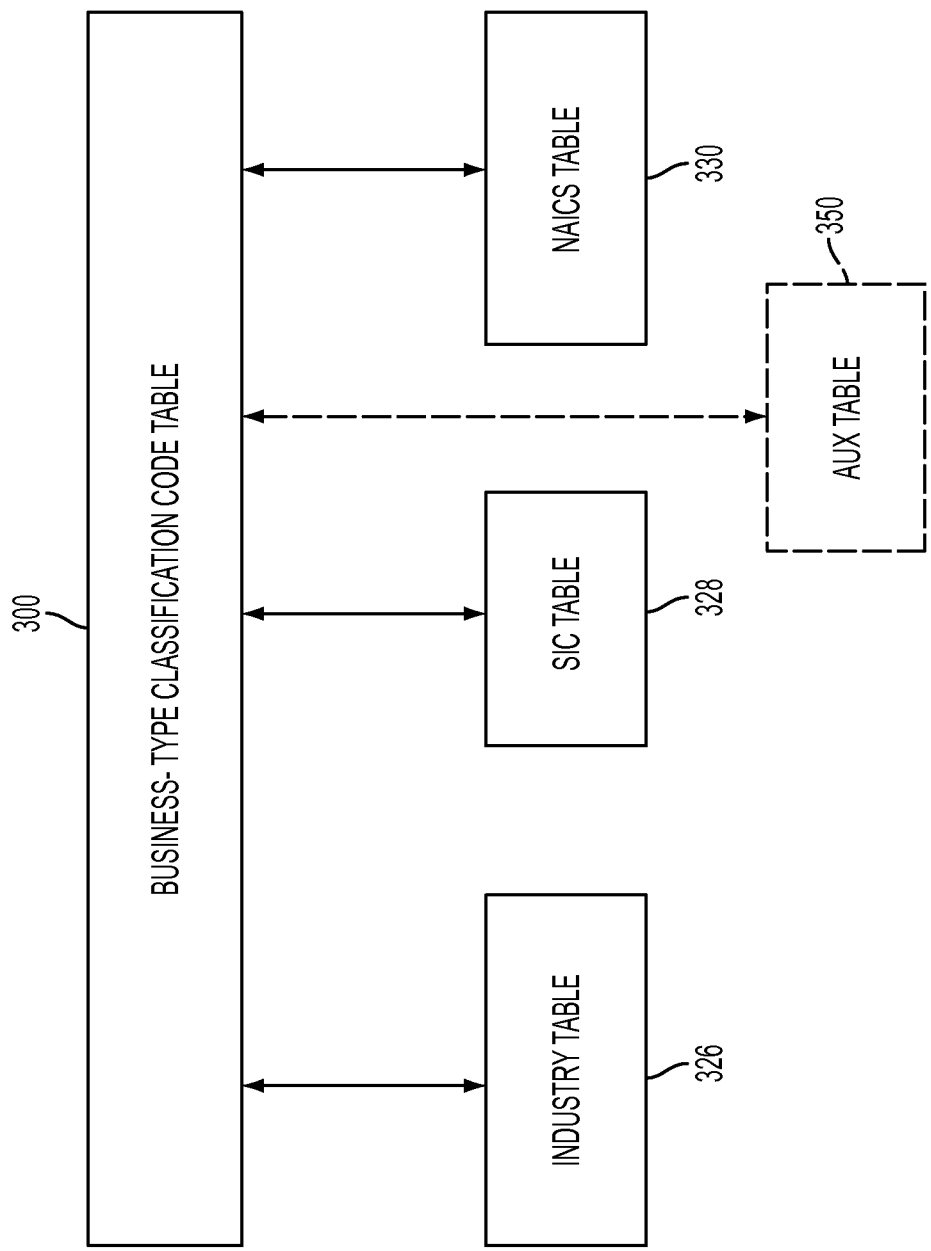

Policy Information

*Policy Effective Date: 12/05/2013 — 402, 406

Sub-Agent Code

Classification

Business Type — 408

*Policy Expiration Date: 12/05/2014 — 404

Policy Number: 005S890520 — 410

Search — 412

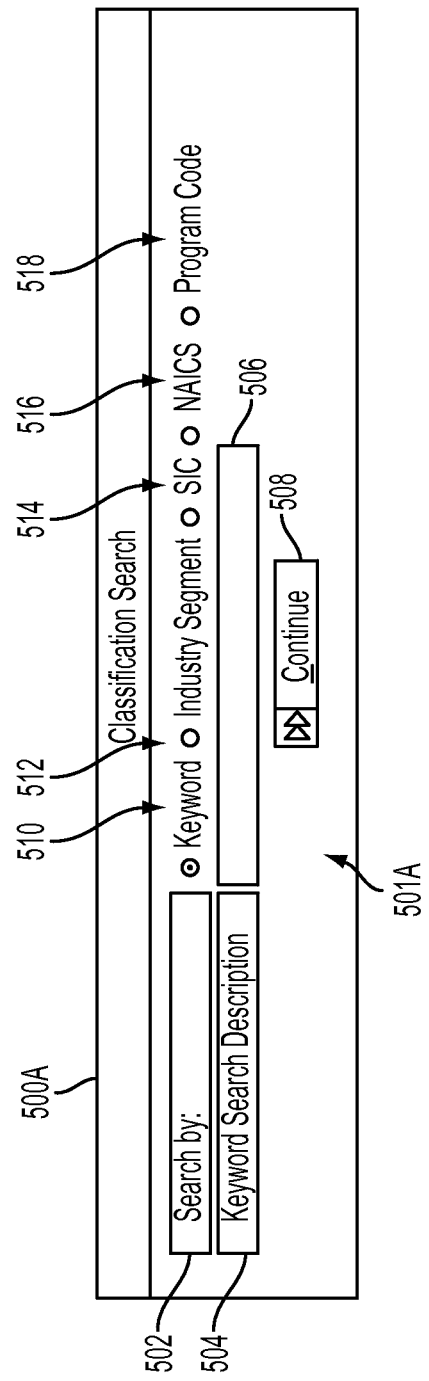
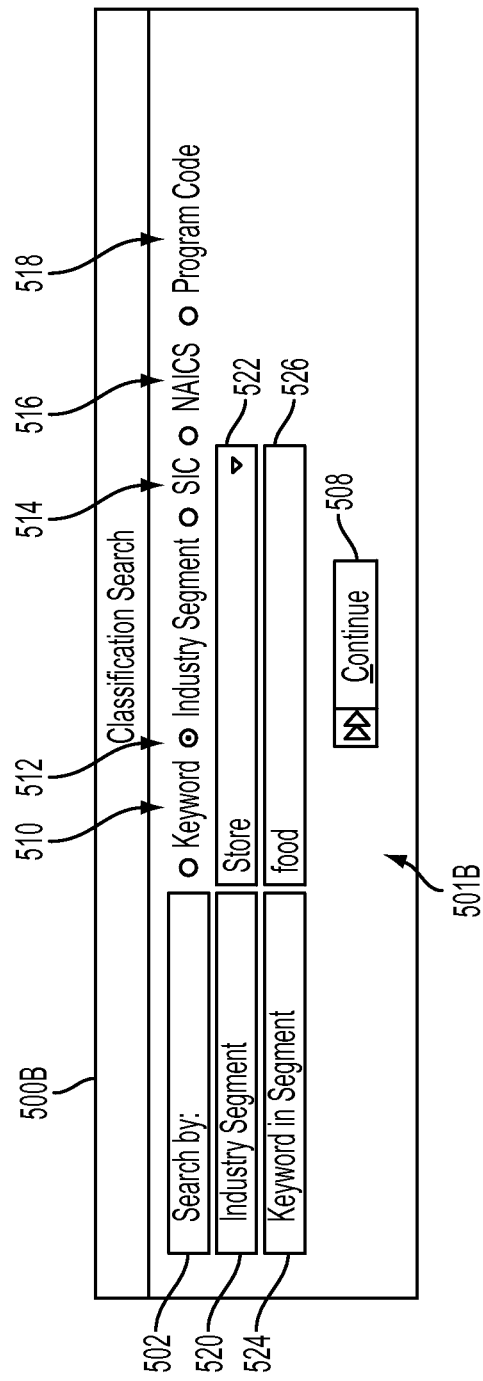
FIG. 5A
FIG. 5B

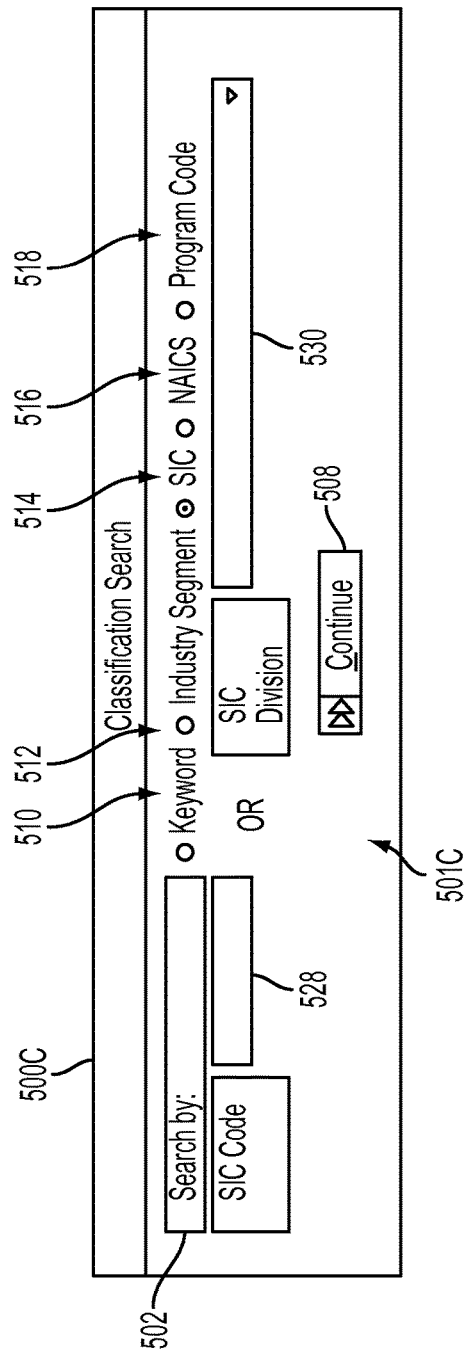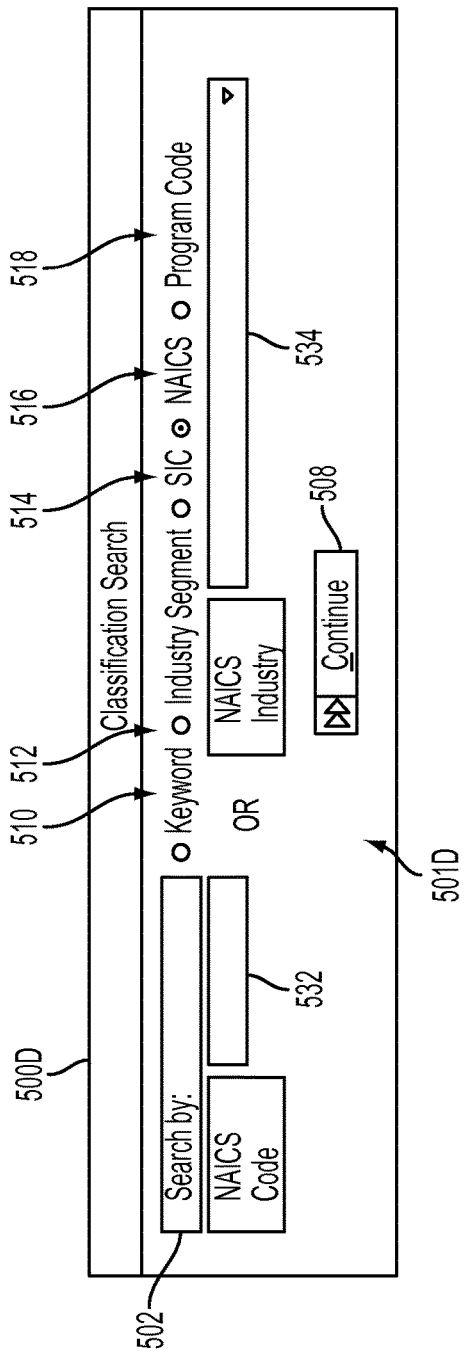
FIG. 5C
FIG. 5D

Other States Insurance

Include Other States Insurance Coverage (3C) on this policy? Yes

801

802

Other States
☑ Alabama
  Coverage Type
☑ Alaska
  Coverage Type

| Actions |
|---|
| 🗔 Quote Proposal |
| 🗎 Rating Worksheet |
| ✉ Send Memo |
| ⊠ View Memo |
| 🗑 Purge Quote |
| ☐ Product Navigator |
| ☐ UW Summary Tool |
| More Actions... |

Quote Summary

| Policy Number: | UB-002708E988 | Policy Effective Date: | 09/01/2012 | | Actions |
|---|---|---|---|---|---|
| Total Premium: | $2,585.00 | Commission Rate: | | | Issue |
| | | | | | Purge Quote |
| | | | | | Quote Proposal |
| | | | | | Rating Worksheet |
| | | | | | View Memo |
| | | | | | Send Memo |
| | | | | | Account Rounding |
| | | | | | Business Liability |
| | | | | | Auto |
| | | | | | Umbrella |
| | | | | | Employee (?) |

Congratulations! MELANIE B can be issued without a referral.

[ Proceed to Issue ] — 901

[ Quote Proposal ]

- For your convenience, certain optional coverages may have been added to your quote based on your customers operations. Click the coverage name to remove or adjust the selections

Policy Level Information

| 3A Covered States | Member/Manager Election(s) | Experience Mod/Merit |
|---|---|---|
| Missouri** | N/A | Mod |
| | | N/A |

**Rate Hold

Employer's Liability Limits

- Selected Limits    100,000/500,000/100,000

Additional State Detail

900

902

PRODUCT NAVIGATOR

BACKGROUND

In industries such as banking, finance, and insurance, proper classification of data is critical to comply with a number of government regulations and to accurately characterize expected risks. The highly regulated yet dynamic nature of classification codes can make it challenging for professionals to stay current on exact numeric codes and associated definitions. This can result in a time consuming process of frequently researching, locating, and identifying proper classification codes using a number of industry sites and/or publications. As one example, when creating a new insurance policy for a business, an insurance professional can seek out and manually input the proper classification codes when entering various attributes that describe risks and/or operations of the business. There are typically multiple levels of classification that must be navigated through to accurately characterize the business. The risk of error or misclassification increases where multiple systems for classification code lookup are used and free-form manual data entry is performed.

When manual searches of various data sources are performed to determine classification codes, knowledge of contents and formatting of the data sources may be required. Data provided by different sources can use similar terms or ambiguous terms that may not be readily apparent without performing further searches to confirm that the code definitions are accurately understood. For example, the North American Industry Classification System (NAICS) provides a method for describing industries to which various organizations belong, but includes many similar classifications, such as: 445291 for Baked Goods Stores, 311811 for Retail Bakeries, 311812 for Commercial Bakeries, 311821 for Cookie and Cracker Manufacturing, 311919 for Other Snack Food Manufacturing, etc. NAICS codes can provide a business-type classification. Multiple coding schemes may be used for classifying businesses and types of operations performed by the businesses. If multiple individual searches of various databases occur across a computing network, then computer system and network performance is typically degraded, as each search requires processing resource time, network bandwidth, and temporary storage space to capture the results of multiple queries. Repeated data entry and numerous searches across multiple computer systems to retrieve similar and sometimes redundant information can reduce overall computer system and network performance.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 2 depicts a block diagram of a system according to some embodiments of the present invention;

FIG. 3B depicts relationships between the tables of FIG. 3A according to some embodiments of the present invention;

FIG. 4 depicts an interactive user display and user input interface according to some embodiments of the present invention;

FIGS. 5A-5E depict other examples of an interactive user display and user input interface according to some embodiments of the present invention;

FIG. 8 depicts another example of an interactive user display and user input interface according to some embodiments of the present invention;

FIG. 9 depicts another example of an interactive user display and user input interface according to some embodiments of the present invention;

DETAILED DESCRIPTION

According to an embodiment, a system for selection of a classification associated with a business type is provided as part of a data entry and analysis system. The system may be used in searching data from multiple sources as part of a classification and selection process. In order to improve computing system performance and throughput, a business classification determination is performed using a product navigator that supports a number of search types and returns an extended data set to assist in guiding a user in confirming selection accuracy and reducing the need for multiple additional queries. As one example, the product navigator can be used as part of an insurance rate/quote/issue system that gathers policy information, performs underwriting and eligibility analysis, determines one or more associated classifications, and generates a quotation for an insurance policy. The product navigator can also provide likely eligibility guidance for other products as part of business type classification and present the eligibility guidance at various points in the insurance rate/quote/issue process. Based on the eligibility guidance for other products, links can be presented during the insurance rate/quote/issue process to perform a more detailed analysis and quote as part of the same transaction while the relevant data are locally available in computer system memory, such that the number or volume of network and data storage system accesses can be reduced, thereby improving overall computer system performance and throughput.

In an exemplary embodiment, a product navigator is provided that simplifies a classification process by integrating numerous business classification data sets with a search interface which supports rapid look-up operations based on a variety of search options. The classification process can be used for insurance quotation generation, financial systems, legal services, banking services, medical record management, shipping classification, economic data classification, or any such application where business classification data are organized and referenced with respect to classification codes. Accordingly, although a detailed example is described herein in reference to an insurance rate/quote/issue process, the product navigator may be generally applicable to any number of industry or governmental systems beyond insurance.

Figure 1:
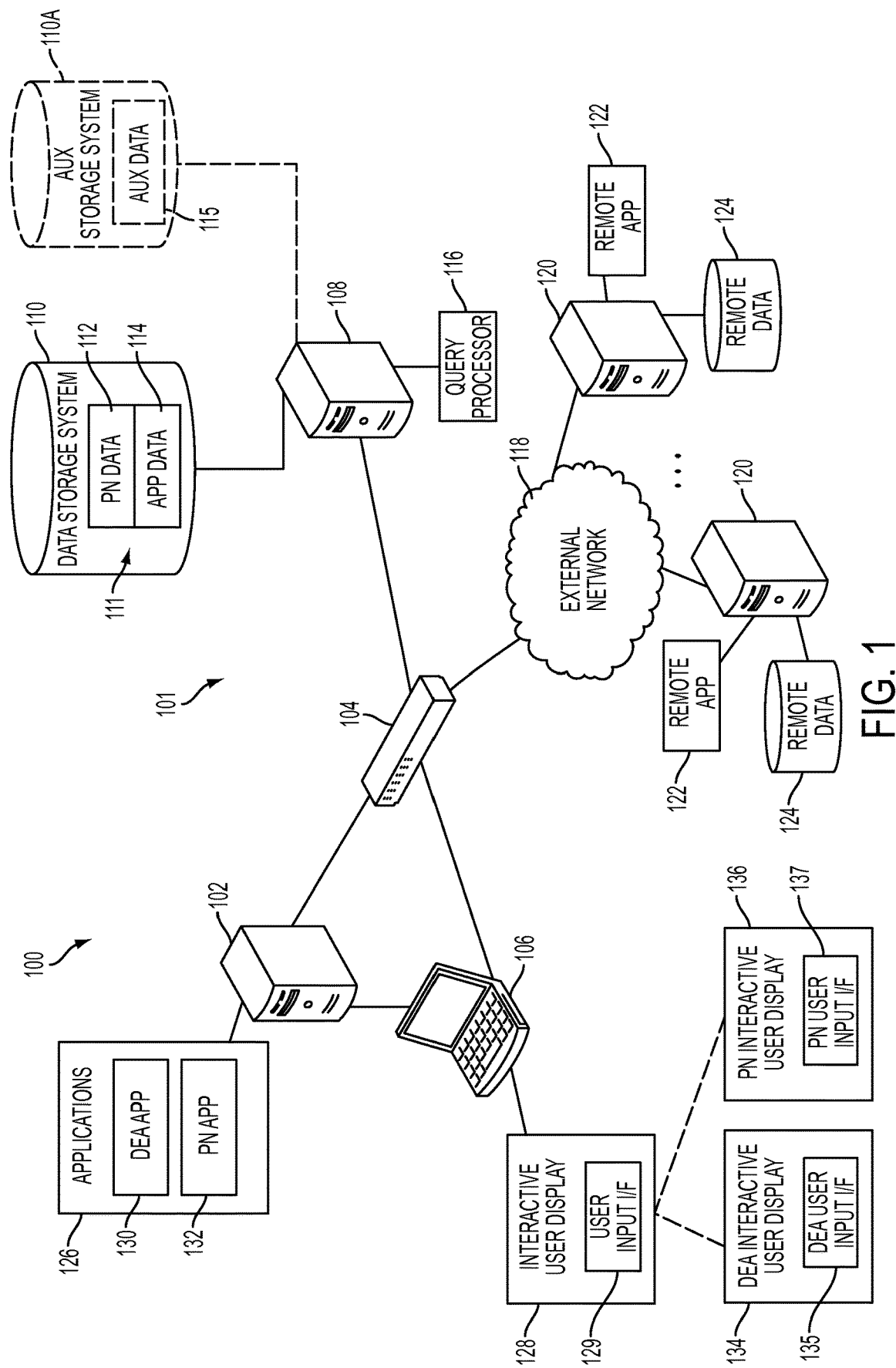
FIG. 1 depicts a block diagram of a system according to some embodiments of the present invention.

Turning now to FIG. 1, a system 100 is depicted upon which an interactive classification code selection process may be implemented. The system 100 includes a data entry and analysis system 101, which may include an application server 102 coupled to a mediation layer gateway 104. A user system 106 can be coupled to the application server 102 and the mediation layer gateway 104. The mediation layer gateway 104 is also coupled to a query server 108 that accesses and indexes data in a data storage system 110. The data storage system 110 can hold a database 111 that may include a variety of data, such as product navigator data 112, application data 114, as well as other data (not depicted). In an exemplary embodiment, the product navigator data 112 can include data organized in one or more tables of records that may be selected as part of the interactive selection process. The application data 114 may include other data values to support an application program that uses the interactive classification code selection process. For example, in an insurance quotation application, the product navigator data 112 may include business-type classification codes and multiple levels of description, while the application data 114 can include applicant information, pricing models, underwriting guidelines, and the like. A query processor 116 may execute on the query server 108 to retrieve selected records from the database 111 based on a query from the application server 102, the user system 106, or other system.

The database 111 may include or link to records stored in other data storage systems, such as an auxiliary data storage system 110A. The auxiliary data storage system 110A can hold auxiliary data 115 that supports or supplements data retrieval from the product navigator data 112. For instance, certain business classification record types and data can be stored in the auxiliary data 115 of the auxiliary data storage system 110A. The auxiliary data storage system 110A may represent a legacy data source that is accessible by the query server 108 as part of classification code searching and presentation of extended and related data sets. Alternatively, the auxiliary data storage system 110A can be omitted and the auxiliary data 115 can be merged with the database 111 in the data storage system 110.

The data entry and analysis system 101 may access an external network 118 via the mediation layer gateway 104 and/or one or more other firewalls or gateways (not depicted). One or more remote servers 120 can be accessed through the external network 118. Each remote server 120 can include one or more remote applications 122 and remote data 124. The external network 118 can be a large-scale, global network, such as the Internet. The remote data 124 may be accessed by the user system 106, for instance, via a hyperlink. The remote data 124 can also be used to update data in the database 111 and/or auxiliary data 115. In one embodiment, the product navigator data 112 is updated by the data entry and analysis system 101 making requests to access the remote data 124 and reformatting the remote data 124 as needed to store in the product navigator data 112. In an alternate embodiment, one of the remote applications 122 with proper authentication can push updates from the remote data 124 to the product navigator data 112 and mark the data as updated.

The application server 102 can source a number of application programs 126 that may be executed by the application server 102, the user system 106, or in a distributed manner between the application server 102, the user system 106 and/or other systems. The user system 106 includes an interactive user display 128 to display information and a user input interface 129 that collects inputs from a user. The interactive user display 128 can be generated by one or more of the applications 126 on the application server 102 and provides information and input options for the user input interface 129. For example, the interactive user display 128 can appear as a data entry template where the user input interface 129 includes user modifiable fields to enter data values or make selections.

The mediation layer gateway 104 can provide an enterprise service bus (ESB) that routes various communications and supports a number of protocols within the system 100. For example, the mediation layer gateway 104 may process Simple Object Access Protocol (SOAP) requests and responses relative to the application server 102, Representational State Transfer (REST) requests and responses using Asynchronous JavaScript™ and extensible markup language (XML) (AJAX) relative to the user system 106, Hypertext Transfer Protocol (HTTP) query requests and responses relative to the query server 108, and any number of known protocols relative to the external network 118. A number of other protocols can be used throughout the system 100. For instance, the application server 102 and user system 106 may support JavaServer™ Faces (JSF)/Facelet requests and responses, and the query server 108 may access the data storage system 110 and/or the auxiliary data storage system 110A using Structured Query Language (SQL) and/or Open Database Connectivity (ODBC).

In the example of FIG. 1, each of the application server 102, the mediation layer gateway 104, the user system 106, the query server 108, the data storage system 110, and the remote servers 120 can include a processor (e.g., a processing device such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the data entry and analysis system 101 executes computer instructions for implementing the exemplary processes described herein. Instructions that implement various process steps can be executed by different elements of the data entry and analysis system 101. For example, user input on the user system 106 can result in a request for data as a query that is processed by the query server 108. User inputs can also result in requests to the application server 102 which may also result in another request for data as a query processed by the query server 108. Although depicted separately, one or more of the application server 102, the mediation layer gateway 104, the user system 106, the query server 108, and the data storage system 110 can be combined or further subdivided. In an embodiment, the data entry and analysis system 101 is implemented by an insurance company.

In some embodiments, the application server 102 may include one or more electronic and/or computerized controller devices such as computer servers communicatively coupled to interface with the user system 106 (e.g., one or more client computers) and/or third-party devices (directly and/or indirectly). According to some embodiments, the application server 102 may be located remote from the user system 106. The application server 102 may also or alternatively include a plurality of electronic processing devices located at one or more various sites and/or locations. In an exemplary embodiment, the application server 102 is a JBoSS™ application server.

According to some embodiments, the application server 102 and/or the user system 106 may store and/or execute specially programmed instructions to operate in accordance with one or more embodiments described in this disclosure. The application server 102 and/or the user system 106 may, for example, execute one or more programs that perform business-type classification data selection.

The user system 106 may be implemented using a computer executing one or more computer programs for carrying out processes described herein. In one embodiment, the user system 106 may be a personal computer (e.g., a laptop, desktop, etc.), a network server-attached terminal (e.g., a thin client operating within an internal network of the application server 102), or a portable device (e.g., a tablet computer, personal digital assistant, smart phone, etc.). In an embodiment, the user system 106 is operated by an insurance professional, such as a product manager, broker, or agent of an insurance company. It will be understood that while only a single user system 106 is shown in FIG. 1, there may be multiple user systems 106 communicatively coupled to the application server 102 and mediation layer gateway 104. The user systems 106 can connect to elements of the data entry and analysis system 101 via an enterprise network and/or through the external network 118.

Various networks may be used to establish communication within the system 100, such as a wide area network (WAN), a local area network (LAN), a global network (e.g., Internet), a virtual private network (VPN), and an intranet. Communication within the system 100 may be implemented using a wireless network or any kind of physical network implementation known in the art.

Information stored in the data storage system 110 and/or the auxiliary data storage system 110A may be retrieved and manipulated via the query server 108, based on requests from the application server 102 or the user system 106, for example. The data storage system 110 and/or the auxiliary data storage system 110A may be implemented using a variety of devices for storing electronic information. It is understood that the data storage system 110 and/or the auxiliary data storage system 110A may be implemented using memory contained in the query server 108 or it may be a separate physical system, as shown in FIG. 1. It will be understood that multiple storage devices may be employed in the data storage system 110 and/or the auxiliary data storage system 110A. For example, the storage devices of the data storage system 110 and/or the auxiliary data storage system 110A may be dispersed across the system 100, and each of the storage devices may be logically addressable as a consolidated data source across a distributed environment. In an embodiment, the data storage system 110 and/or the auxiliary data storage system 110A may include one or more third-party data devices. According to some embodiments, data may be stored by or provided via one or more optional third-party data devices of system 100. A third-party data device may comprise, for example, an external hard drive or flash drive connected to the system 100, a remote third-party computer system for storing and serving data (e.g., claim data, business data, state insurance data) for use in performing one or more functions described in this disclosure, or a combination of such remote and/or local data devices. In one embodiment, one or more companies and/or end users may subscribe to or otherwise purchase data (e.g., demographic, financial, employment, claim, or other data) from a third party and receive the data via the third-party data device.

Each of the application server 102, the mediation layer gateway 104, the user system 106, the query server 108, the data storage system 110, the auxiliary data storage system 110A, and the remote servers 120 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The applications 126 of application server 102 can include multiple application programs or sequences of instructions to implement processes as described herein. For example, a data entry and analysis (DEA) application 130 may include a sequence of executable instructions that enable a user to enter relevant information, access associated application data 114, perform analysis tasks such as determining eligibility, initiate a classification process, and provide results and reports. Although depicted as a single block in FIG. 1, the DEA application 130 can include a collection of modules, routines, functions, scripts, and the like to implement a data entry and analysis process. A product navigator (PN) application 132 may also be provided to ensure that a correct business-type classification code is selected upon which other data values depend. The PN application 132 can also provide selection guidance along with likely eligibility for other products based on selected business type. The PN application 132 can interface with the query processor 116 to perform lookup and reporting of the product navigator data 112 in combination with the DEA application 130. The query processor 116 may provide rapid feedback to the PN application 132 by maintaining a number of indexes into the product navigator data 112, which may include synonym definitions to support matching on similar terms when a search is initiated. The query processor 116 or another process on the query server 108 may include an automated process that periodically updates and indexes the database 111. The query processor 116 can also support wildcard searches based on partial string matching to exact terms or similar terms based on synonym definitions. Although depicted separately, the DEA application 130 and the PN application 132 can be combined to form a single application in the applications 126. The PN application 132 may alternatively be decomposed into a number of sub-applications, modules, or functional units.

According to a design pattern of the interactive user display 128 and user input interface 129, the user system 106 can include one or more instances of a DEA interactive user display 134 with a DEA user input interface 135 that interacts with the DEA application 130. The DEA interactive user display 134 may define one or more form templates to be populated with data obtained through the application server 102 and/or the query server 108 as a Web browser-based or stand-alone application implementation. The DEA interactive user display 134 and DEA user input interface 135 may include a sequence of display screens and user interfaces to be presented at different points during progression of the process. For example, different interactive interface views can be produced to enter specific data items, respond to questions, and output results.

Also according to a design pattern of the interactive user display 128 and user input interface 129, a PN interactive user display 136 and PN user input interface 137 can be defined separately or be included as part of the DEA interactive user display 134 and DEA user input interface 135. The PN interactive user display 136 and PN user input interface 137 interact with the PN application 132 according to one or more form templates populated with user data and data obtained through the application server 102 and/or the query server 108 as a Web browser-based or stand-alone application implementation. Depending upon a search type performed, the PN interactive user display 136 may present different classification code selection options that can be selected using the PN user input interface 137.

One example of a general sequence of interactions that can be initiated by a user in the system 100 begins with user input received on the user input interface 129 (which may be the DEA user input interface 135 or PN user input interface 137), for instance, from a keyboard and/or mouse/pointer device. When a request, such as a search request, is received at the user system 106, the search request may be forwarded to the mediation layer gateway 104 using an AJAX interface as a REST-based request. In response, the mediation layer gateway 104 can generate a query request for the query server 108 as an HTTP query request. The query processor 116 performs a query process to find potential matches to the query request in the data storage system 110 and/or the auxiliary data storage system 110A and a response may be provided as an HTTP query response from the query server 108 to the mediation layer gateway 104. Subsequently, the mediation layer gateway 104 can make the query response available to be obtained by an AJAX interface as a REST-based response for the user system 106. With regard to the application server 102, a request from a client can be obtained, such as a facelet request obtained by the application server 102 from the user system 106. The request can be sent from the application server 102 to the mediation layer gateway 104 as a SOAP-based request using a JAX-web service. Again, the mediation layer gateway 104 can use an HTTP query request and an HTTP query response in communicating with the query server 108. A response can be obtained from the mediation layer gateway 104 by the application server 102 as a SOAP-based response using a JAX-web service. The application server 102 can provide the facelet response to the user system 106.

FIG. 2 depicts a block diagram of a system 200 according to an embodiment. The system 200 is depicted embodied in a computer 201 in FIG. 2. The system 200 is an example of the user system 106 of FIG. 1. The application server 102, the mediation layer gateway 104, the query server 108, and the remote servers 120 of FIG. 1 can also include similar computer elements as depicted in the computer 201 of FIG. 2.

In an exemplary embodiment, in terms of hardware architecture, as shown in FIG. 2, the computer 201 includes a processing device 205 and a memory device 210 coupled to a memory controller 215 and an input/output controller 235. The input/output controller 235 can be, for example, but not limited to, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 is a hardware device for executing software, particularly software stored in secondary storage 220 or memory device 210. The processing device 205 can be any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the DEA interactive user display 134, the DEA user input interface 135, the PN interactive user display 136, and/or the PN user input interface 137 of FIG. 1, where the system 200 is an embodiment of the user system 106 of FIG. 1. Further examples of the program instructions 216 can include instructions to implement the DEA application 130 and PN application 132 of FIG. 1, the query processor 116 of FIG. 1, and the remote applications 122 of FIG. 1.

The computer 201 of FIG. 2 also includes a network interface 260 that can establish communication channels with one or more other computer systems via one or more network links. The network interface 260 can support wired and/or wireless communication protocols known in the art. For example, when embodied in the user system 106 of FIG. 1, the network interface 260 can establish communication channels with the application server 102 and the mediation layer gateway 104 of FIG. 1.

Figure 3A:
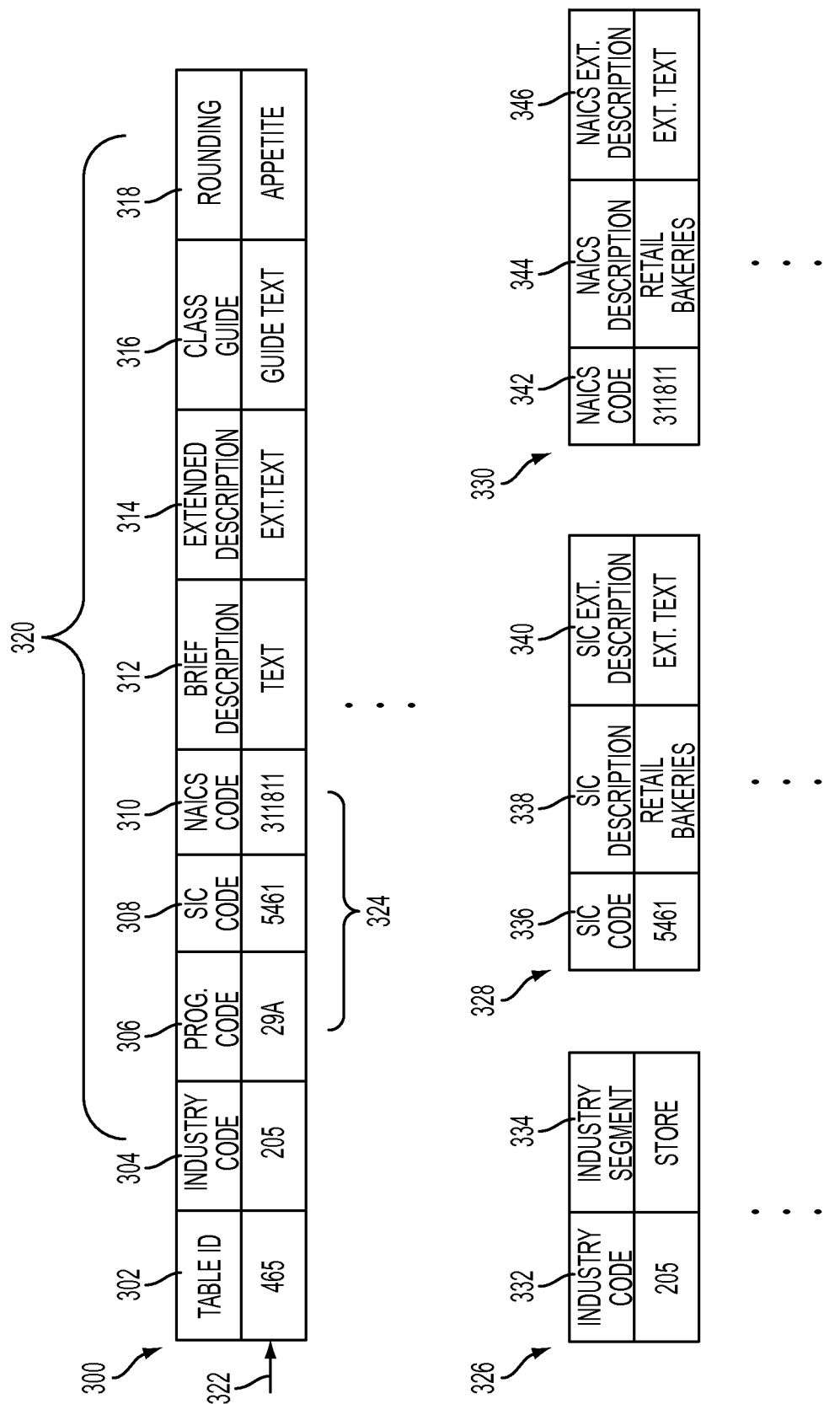
FIG. 3A depicts tables for a product navigator according to some embodiments of the present invention.

Turning now to FIG. 3A, an example of a business-type classification code table 300 is depicted as may be included in the product navigator data 112 of FIG. 1. The business-type classification code table 300 represents a collection of data values that can be searched, for instance, based on a query request from the PN application 132 via the PN user input interface 137 of FIG. 1. The business-type classification code table 300 may be manually populated based on published data sources or extracted from the remote data 124 of FIG. 1. The business-type classification code table 300 can also be populated using legacy data for previously defined company specific codes and descriptions. In the example of FIG. 3A, the business-type classification code table 300 is formatted for business-type classification to support generating insurance quotes that are business-type sensitive.

The business-type classification code table 300 of FIG. 3A includes a table identifier 302, an industry code 304, a program code 306, a Standard Industry Classification (SIC) code 308, a North American Industry Classification System (NAICS) code 310, a brief classification description 312, an extended classification description 314, a classification guide 316, and additional product provisioning opportunities (rounding) 318. The combination of the industry code 304, program code 306, SIC code 308, NAICS code 310, brief classification description 312, extended classification description 314, classification guide 316, and additional product provisioning opportunities 318 may be collectively referred to as business-type classification data 320 for preparing quotes and issuing insurance policies. The table identifier 302 may serve as an index to a particular entry or row 322 in the business-type classification code table 300. The industry code 304 can be an industry group code that aligns with definitions generated by a regulating body. The program code 306 may be a company-specific code used to classify business types. The SIC code 308 and the NAICS code 310 can be defined according to standards promulgated by governmental bodies. The program code 306, SIC code 308, and/or NAICS code 310 may be generally referred to as a classification code 324. The brief classification description 312 includes a shorter text description that is associated with the classification code 324, while the extended classification description 314 includes a longer text description that is associated with the classification code 324. For instance, the brief classification description 312 may include one or two words, while the extended classification description 314 may include one or two sentences.

The extended classification description 314 includes further information on the types of activities that fit the associated classification code 324, while the classification guide 316 may define similar types of activities that are known to not fit the associated classification code 324. The classification guide 316 provides additional guidance for making selections between a number of similar options. For instance, the classification guide 316 can include a list of other business types that have separate entries in the business-type classification code table 300. As an example, an entry or row 322 in the business-type classification code table 300 having a brief classification description 312 of "Bakery" can include an extended classification description 314 such as: "An operation primarily engaged in the retail sale of an assortment of baked goods. Many retail bakeries are also cafés, serving coffee and tea to customers." Guidance in the classification guide 316 for the same entry or row 322 can indicate that a "Baked Goods Store", "Bakery Products, Frozen-Wholesale", and a "Coffee Shop and Supplies Store" are separate classifications. Thus, by providing both extended descriptions with positive examples for the types of activities that match the associated classification code 324 as well as negative examples of business types that are similar but separately classified in the classification guide 316, a user selection can be made to rapidly converge on a correct classification with a high degree of confidence, thereby reducing a number of additional queries initiated in the data entry and analysis system 101 of FIG. 1 and increasing the efficiency of the system 100 of FIG. 1.

Further efficiency improvements in the system 100 of FIG. 1 can be provided by the additional product provisioning opportunities 318 in the business-type classification data 320. The additional product provisioning opportunities 318 may define an appetite for other product types based on known risks and other factors for the associated classification code 324 to round out product offerings as part of preparing a quote for a single product. For instance, a particular business may express an interest in a workers compensation insurance policy, and the business-type classification code table 300 can be accessed as part of preparing a quote for a workers compensation insurance policy. When classifying a business type in preparing the workers compensation insurance quote, it may become apparent as to other types of products, such as insurance products, that such a business type is typically eligible to attain. The additional product provisioning opportunities 318 can be encoded with one or more appetite codes indicating products that a business type having the associated classification code 324 is likely eligible to attain. For instance, an insurance provider that underwrites workers compensation insurance policies for a bakery may have an appetite to underwrite business liability, automotive, and umbrella insurance policies for bakeries as well, thus further rounding out the options available to the business seeking workers compensation insurance. As another example, for business types that likely use water vessels, the additional product provisioning opportunities 318 can indicate an appetite for marine insurance coverage. For business types having an unacceptable level of risk, such as an explosives manufacturer, the additional product provisioning opportunities 318 can indicate which product types are outside of appetite, such as a transportation insurance policy. By making the additional product provisioning opportunities 318 information available in the business-type classification data 320, the number of further queries and amount of repetitive data entry in the system 100 of FIG. 1 can be reduced, as an answer to whether the business would likely be eligible for additional products can be predictively answered as part of a business-type classification query result.

A number of tables related to the business-type classification code table 300 may be defined to provide additional related information. In the example of FIG. 3A, an industry table 326, a SIC table 328, and a NAICS table 330 include additional information that may also be searchable. For instance, the industry table 326 can include additional industry information, such as a list of industry codes 332 and industry segment descriptions 334. The SIC table 328 can include a list of SIC codes 336, SIC descriptions 338, and SIC extended descriptions 340. The NAICS table 330 can include a list of NAICS codes 342, NAICS descriptions 344, and NAICS extended descriptions 346.

The industry code 304 of the business-type classification code table 300 may have a corresponding entry in the industry table 326 that matches one of the industry codes 332 and the industry segment descriptions 334. Therefore, if an industry segment search is initiated as a numerical value, the industry code 304 can be directly searched; however, if the industry segment search includes text, the search can be directed to the industry table 326 to search for an entry in the industry segment descriptions 334 that matches the search term or terms, and an associated value in the industry codes 332 can be used to search against the business-type classification code table 300 for a match in the industry code 304.

As a further option, the industry segment descriptions 334 can be directly incorporated in the business-type classification code table 300 as a searchable field. Additionally, industry segment searches can use the industry codes 332 and/or the industry segment descriptions 334 as filters to further limit keyword searches for other fields, such as searching the brief classification description 312 and/or the extended classification description 314 for a keyword in combination with a specific value for the industry code 304.

The brief classification description 312 in the business-type classification code table 300 may exactly match one of the SIC descriptions 338, one of the NAICS descriptions 344, or be phrased to capture intersecting terminology between the SIC descriptions 338 and the NAICS descriptions 344. Similarly, the extended classification description 314 in the business-type classification code table 300 may exactly match one of the SIC extended descriptions 340, one of the NAICS extended descriptions 346, or be phrased to capture intersecting descriptions between the SIC extended descriptions 340 and the NAICS extended descriptions 346. Accordingly, a SIC search that includes a numeric value may initiate a search against the SIC code 308 in the business-type classification code table 300, while a SIC search that includes text can be performed against the SIC descriptions 338 and/or the SIC extended descriptions 340 with the corresponding SIC code 336 used to locate a matching value in the SIC code 308. Similarly, a NAICS search that includes a numeric value may initiate a search against the NAICS code 310 in the business-type classification code table 300, while a NAICS search that includes text can be performed against the NAICS descriptions 344 and/or the NAICS extended descriptions 346 with the corresponding NAICS code 342 used to locate a matching value in the NAICS code 310. Alternatively, the SIC descriptions 338, SIC extended descriptions 340, NAICS descriptions 344, and/or NAICS extended descriptions 346 can be directly incorporated in the business-type classification code table 300 as one or more searchable fields.

FIG. 3B depicts an example of relationships between various tables. The business-type classification code table 300 can be linked to the industry table 326, the SIC table 328, and the NAICS table 330 as described in reference to FIG. 3A. Additionally, the business-type classification code table 300 can be linked to one or more other tables, such as an auxiliary table 350, which may be stored in the auxiliary data 115 of FIG. 1. The auxiliary table 350 can define other product information, other classification data, or further supplemental data related to business-type classification. As one example, the auxiliary table 350 can include workers compensation insurance classification rules associated with various locations.

FIG. 4 depicts an example of an interactive user display 400 and user input interface 401 to populate information related to an insurance policy, for instance, as one instance of the DEA interactive user display 134 and DEA user input interface 135 of FIG. 1. The interactive user display 400 can prompt a user to enter a number of values related to an insurance policy, where the user input interface 401 defines a data entry interface for collecting information such as a policy effective date 402, a policy expiration date 404, a sub-agent code 406, and a business type classification 408. When a policy quote is initiated, a policy number 410 may be generated by the DEA application 130 of FIG. 1 to track data associated with developing the quote as values are populated. The policy effective date 402 and a policy expiration date 404 bound the term of the potential policy and may be used to select particular data sets from the data storage system 110 and/or auxiliary data storage system 110A of FIG. 1 that are date sensitive. The sub-agent code 406 may be used to identify an agent preparing the quote. The business type classification 408 needs to align with a value of the business-type classification data 320 such that all associated codes, including one or more associated classification code 324, are properly selected. A user may enter a search string in the user input interface 401 for the business type classification 408 and select a search button 412 or otherwise trigger a search. The business type classification 408 is part of a business-type classification interface and selecting the search button 412 may trigger the PN application 132 of FIG. 1 to initiate a search. If no match is found or multiple results are found or if the business type classification 408 is not populated prior to initiating a search, a further interactive user display, such as an interactive user display 500A of FIG. 5A, may be displayed.

FIG. 5A depicts an embodiment of the interactive user display 500A and user input interface 501A for business-type classification searching as an example of the PN interactive user display 136 and PN user input interface 137 of FIG. 1, and therefore the user input interface 501A may also be referred to as a business-type classification interface. The interactive user display 500A may be displayed on a user system 106 of FIG. 1. The user input interface 501A can include a search type selection field 502, a search description field 504, a search description input 506, and a continue button 508. The search type selection field 502 may provide multiple options for a search type to be performed, such as a keyword search 510, an industry segment search 512, a SIC search 514, a NAICS search 516, and a program code search 518. Additional search options can be added to further narrow the results. A value input as the business type classification 408 of FIG. 4 may be carried through and used to populate the search description input 506. Regardless of the search type selected, the search description input 506 may support type-ahead searching using partial strings for searching and progressively refining matching values. Searching of the database 111 of FIG. 1 based on values entered into the search description input 506 can include searching for one or more of: exact string matches, partial string matches, and synonym matches. The query processor 116 of FIG. 1 can determine a match of the search description input 506 as a search string and retrieve a corresponding data set from the database 111 of FIG. 1.

Figure 5E:
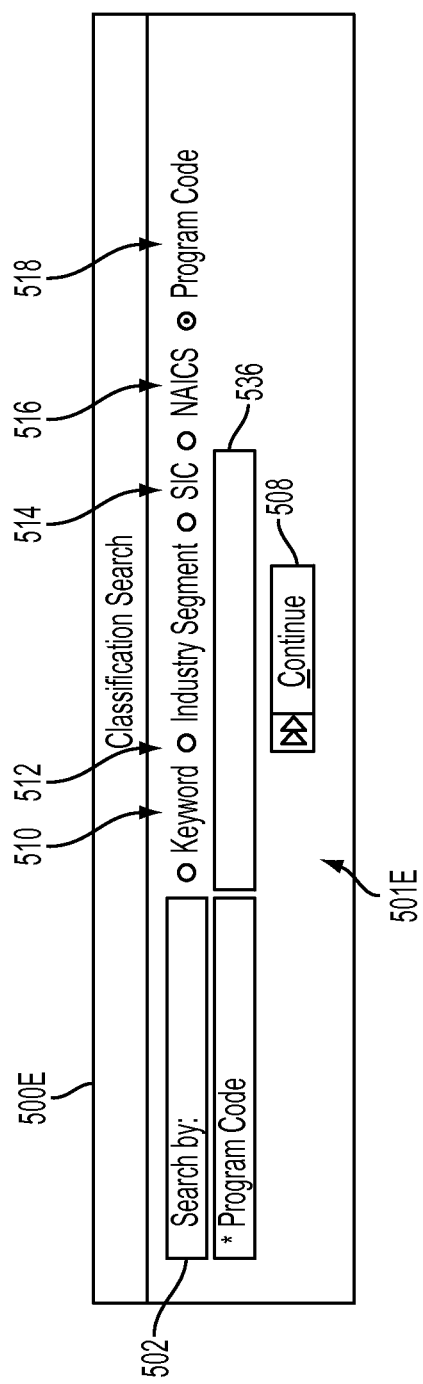

If the keyword search 510 is selected, then the value in the search description input 506 may be used as a search string against the brief classification description 312 and/or extended classification description 314 of FIG. 3A. If the industry segment search 512 is selected, then the interactive user display 500A and user input interface 501A may be reformatted as interactive user display 500B and user input interface 501B, as depicted in FIG. 5B. If the SIC search 514 is selected, then the interactive user display 500A and user input interface 501A may be reformatted as interactive user display 500C and user input interface 501C, as depicted in FIG. 5C. If the NAICS search 516 is selected, then the interactive user display 500A and user input interface 501A may be reformatted as interactive user display 500D and user input interface 501D, as depicted in FIG. 5D. If the program code search 518 is selected, then the interactive user display 500A and user input interface 501A may be reformatted as interactive user display 500E and user input interface 501E, as depicted in FIG. 5E.

In the example of an industry segment search in FIG. 5B, values of the industry segment descriptions 334 of FIG. 3A can be presented as industry segment options 520 from a pull-down selection interface 522. A value from the industry codes 332 of FIG. 3A corresponding to the industry segment descriptions 334 may be determined based on the pull-down selection interface 522 to use as a filter for the industry code 304 of FIG. 3A with respect to searching the business-type classification data 320 of FIG. 3A. It is noted that industry code values, e.g., industry code 304 or industry code 332, need not be displayed on the interactive user display 500B. In the illustrated embodiment, a search input 526 is provided for locating a keyword based on industry segment 524. The search input 526 may be used as a search string against the brief classification description 312 and/or extended classification description 314 of FIG. 3A, as limited by industry segment.

In the example of a SIC search in FIG. 5C, the value in a SIC code search input 528 may be used as a search string against the SIC codes 308, the SIC descriptions 338, and/or the SIC extended descriptions 340 of FIG. 3A. Alternatively, a SIC division pull-down interface 530 can be used for classification searching, where a mapping is defined between a list of SIC divisions and values of the SIC codes 308, the SIC descriptions 338, and/or the SIC extended descriptions 340 of FIG. 3A.

In the example of a NAICS search in FIG. 5D, the value in a NAICS code search input 532 may be used as a search string against the NAICS codes 310, the NAICS descriptions 344, and/or the NAICS extended descriptions 346 of FIG. 3A. Alternatively, a NAICS industry pull-down interface 534 can be used for classification searching, where a mapping is defined between a list of NAICS industries and values of the NAICS codes 310, the NAICS descriptions 344, and/or the NAICS extended descriptions 346 of FIG. 3A.

In the example of a program code search in FIG. 5E, the value in a program code input 536 may be used as a search string against the program code 306 of FIG. 3A. The program code input 536 may support a combination of letters, numbers, and/or special characters depending upon program code definition and field type constraints.

Figure 6:
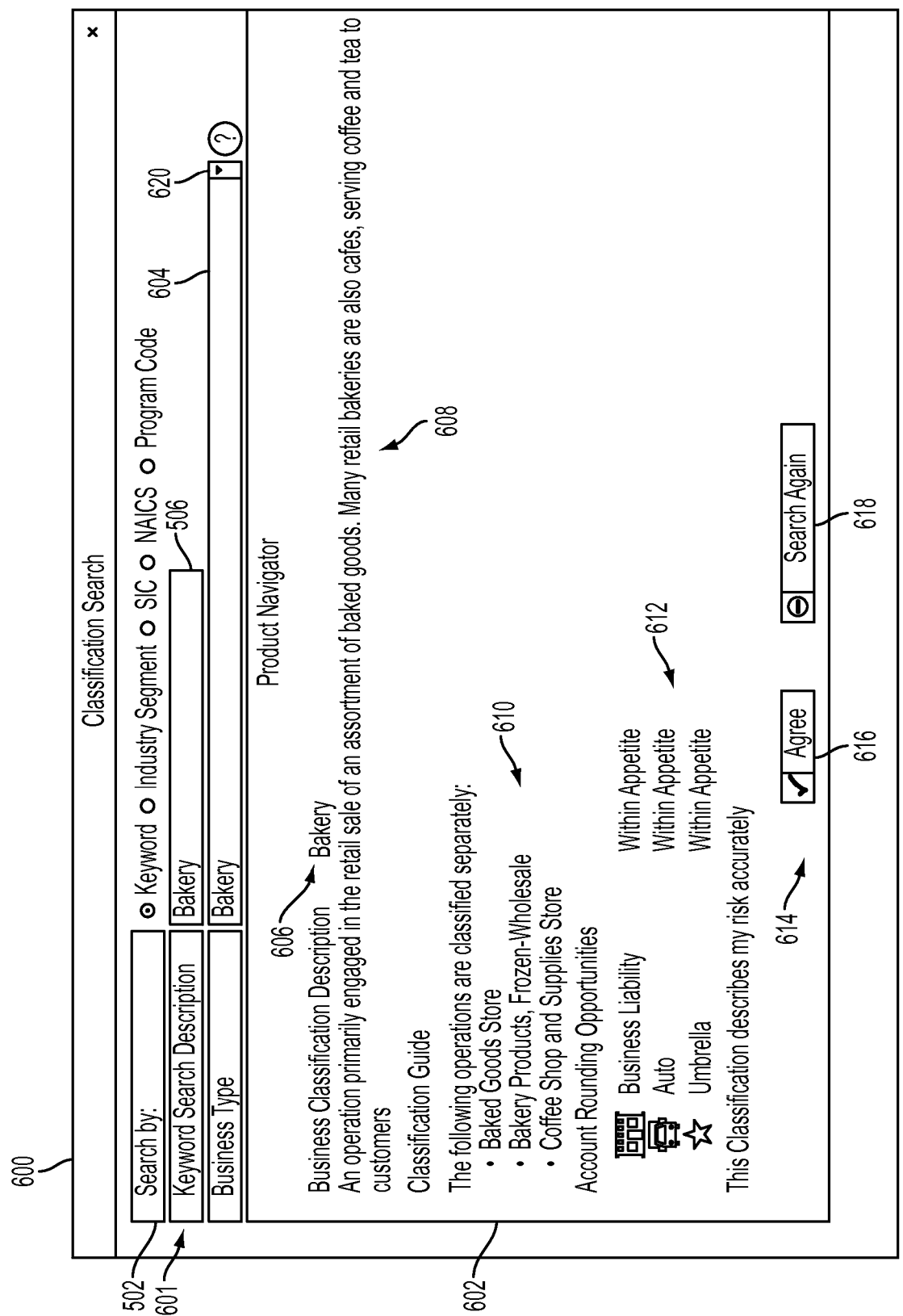
FIG. 6 depicts another example of an interactive user display and user input interface according to some embodiments of the present invention.

FIG. 6 depicts an embodiment of an interactive user display 600 and user input interface 601 for business-type classification searching as an example of the PN interactive user display 136 and PN user input interface 137 of FIG. 1, and therefore the user input interface 601 may also be referred to as a business-type classification interface. The interactive user display 600 of FIG. 6 is an extension of the interactive user display 500A of FIG. 5A and represents an exemplary interactive user display after searching is initiated in FIG. 5A. Similar instances of the interactive user display 600 of FIG. 6 can be displayed alternatively with respect to the interactive user displays 500B-500E of FIGS. 5B-5E depending upon the search type selected in the search type selection field 502. The interactive user display 600 also includes a product navigator pane 602 to output search results. In response to initiating a search of the database 111 of FIG. 1 for an entry matching the search string from search description input 506 according to the search type selected in the search type selection field 502, an entry or row 322 of FIG. 3A can be returned having corresponding business-type classification data 320 of FIG. 3A. Some values returned on the business-type classification data 320 of FIG. 3A are displayed on the interactive user display 600 and other values may not be displayed but are available for use by the DEA application 130 and/or the PN application 132 of FIG. 1.

A business type classification 604 can be populated with a value from a matching entry of the searching, such as the brief classification description 312 of FIG. 3A. A brief classification description 606 and an extended classification description 608 can be output in the product navigator pane 602 of the interactive user display 600 based on receiving the corresponding business-type classification data 320 including the brief classification description 312 and the extended classification description 314 of FIG. 3A from the database 111 of FIG. 1. The business-type classification data 320 of FIG. 3A received in response to the searching can also include the classification guide 316 of FIG. 3A that defines classification separation examples between business types identified as being similar to a business type defined in the brief classification description 312 of FIG. 3A. The classification guide 316 of FIG. 3A can be output as classification guide 610 in the product navigator pane 602 of the interactive user display 600 based on receiving the corresponding business-type classification data 320 of FIG. 3A from the database 111 of FIG. 1. The classification guide 610 is output prior to receiving a response to a confirmation request 614 such that a user can have substantial guidance and examples for review before making a decision and without requiring additional steps to lookup the classification guide 610.

The business-type classification data 320 of FIG. 3A returned in response to searching can also include a list of additional product provisioning opportunities 318 associated with a business type defined in the brief classification description 312 of FIG. 3A. The list of additional product provisioning opportunities 318 of FIG. 3A may be output as account rounding opportunities 612 on the product navigator pane 602 of the interactive user display 600 based on receiving the corresponding business-type classification data 320 of FIG. from the database 111 of FIG. 1.

The product navigator pane 602 of the interactive user display 600 can also include a confirmation request 614 that enables a user to agree that the classification is correct, e.g., using an agree button 616. Upon receiving an affirmative response to the confirmation request 614, such as a detected click event on the agree button 616, the business-type classification data 320 of FIG. 3A returned in response to the searching are confirmed and the values can be used by the DEA application 130 of FIG. 1 to continue with the quoting process. For instance, the classification code 324 of FIG. 3A, which may include the program code 306, the SIC code 308, and/or the NAICS code 310, can be used to populate one or more classification code fields used to prepare an insurance policy. A new search request option can be presented in combination with the confirmation request 614 to request a new search, e.g., using a search again button 618 in the product navigator pane 602 of the interactive user display 600. Based on receiving an affirmative response to the new search request option, for instance by detecting a click event on the search again button 618, the contents of the product navigator pane 602 including at least the brief classification description 606 and the extended classification description 608 may be cleared along with the search string in the search description input 506 and the business type classification 604.

When a search results in multiple entries in the database 111 of FIG. 1 matching the search string in the search description input 506, a list of the business-type classification data can be created that corresponds to the matching entries. A selection interface 620 may be provided to enable a user selection of one of the matching entries. The selection interface 620 can be a drop-down box that defaults to an alpha-numerically ordered first entry of the matching entries and displays additional entries of the matching entries in response to a user-initiated drop-down request, e.g., detecting a click event on a down arrow in the selection interface 620. The brief classification description 606, the extended classification description 608, the classification guide 610, the account rounding opportunities 612, and the associated classification code 324 of FIG. 3A may be extracted from the list of the business-type classification data based on the user selection of one of the matching entries. Any changes to the business type classification 604 may be reflected in the business type classification 408 of FIG. 4.

Figure 7:
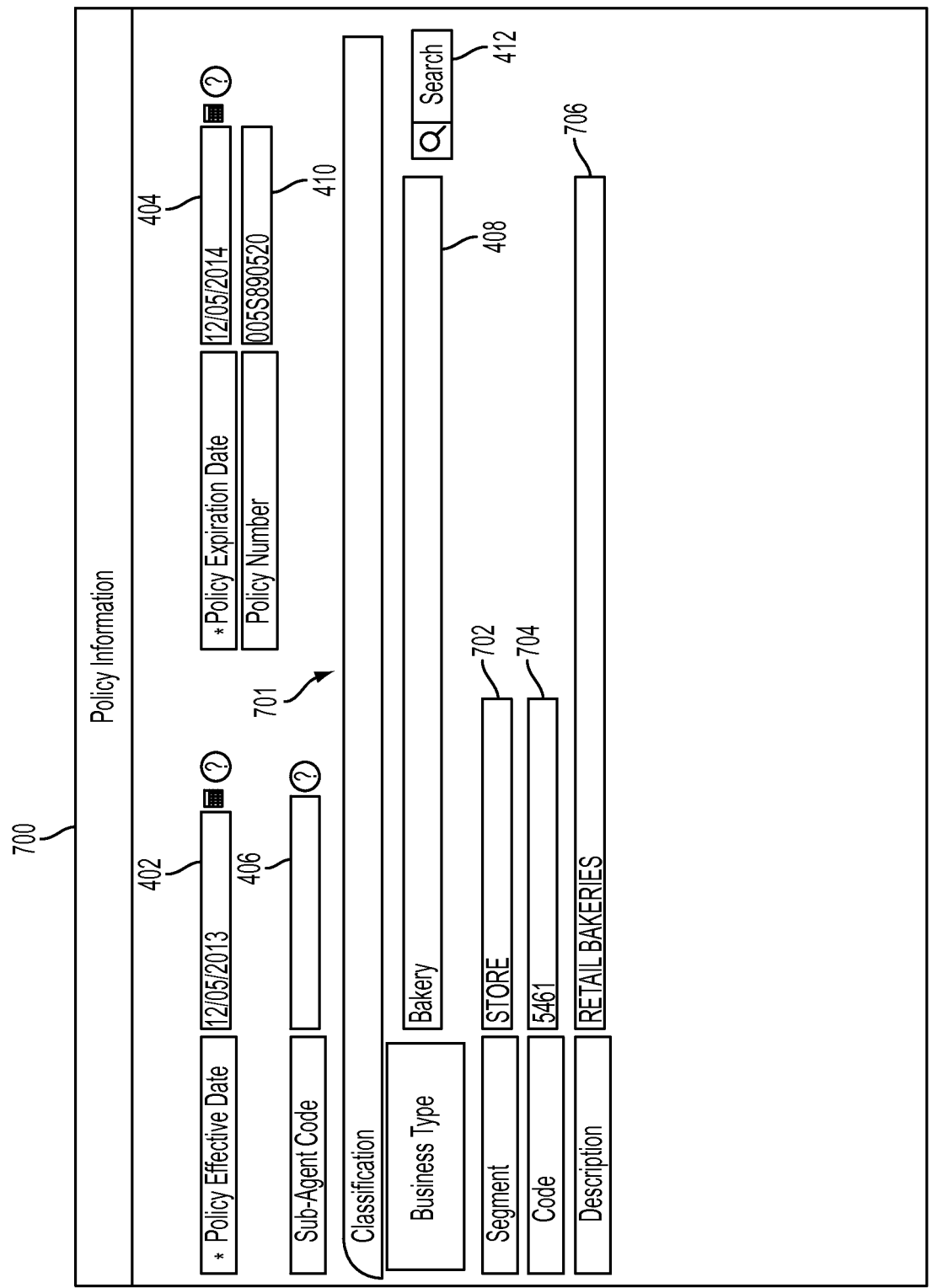
FIG. 7 depicts another example of an interactive user display and user input interface according to some embodiments of the present invention.

FIG. 7 depicts an example of an interactive user display 700 and user input interface 701 as an extended version of the interactive user display 400 and user input interface 401 of FIG. 4 after an affirmative response to the confirmation request 614 of FIG. 6. After a user clicks the agree button 616 of FIG. 6, associated classification fields are populated in FIG. 7. For example, an industry segment field 702 is populated with a corresponding industry segment from the industry segment descriptions 334 having an industry code 332 that matches the industry code 304 of the business-type classification data 320 of FIG. 3A. A classification code field 704 may be populated with an associated classification code 324, such as a program code 306, SIC code 308, or NAICS code 310, from the business-type classification data 320 of FIG. 3A. A description field 706 may be populated with a brief classification description 312, one of the SIC descriptions 338, or one of the NAICS descriptions 344 of FIG. 3A depending upon the classification code type displayed in the classification code field 704. The information populated in fields 702-706 can be applied for use again along with other values from the business-type classification data 320 of FIG. 3A as policy information collection and processing progresses through rating, quoting, and potentially issuing one or more insurance policies.

FIG. 8 depicts an example of an interactive user display 800 and user input interface 801 where additional data collection can occur subsequent to displaying the interactive user display 700 of FIG. 7. An action pane 802 can be included as part of the interactive user display 800 of FIG. 8 to provide a number of user selectable options that remain visible as processing advances to subsequent input interfaces. In the example of FIG. 8, the action pane 802 provides a product navigator button 804 as a visual command to launch a business-type classification interface, such as the interactive user displays 500A-E, 600 and user input interfaces 501A-E, 601 of FIGS. 5A-E and 6. Thus, as data collection advances, if it becomes apparent that the initial business type classification was incorrect, a user can select the product navigator button 804 from a subsequent input interface to modify the selected business type without having to navigate screen-by-screen back to the interactive user display 400 and user input interface 401 of FIG. 4, thereby reducing processing workload in the system 100 of FIG. 1 associated with multiple navigation steps.

FIG. 9 depicts an example of an interactive user display 900 and user input interface 901 where a quote is complete and a summary is presented. FIG. 9 illustrates that the list of additional product provisioning opportunities 318 of FIG. 3A and output as account rounding opportunities 612 of FIG. 6 is displayed in a portion 902 of the interactive user display 900 that remains visible as processing advances to subsequent input interfaces. Thus, when the user reaches a completed quote, account rounding opportunities can be presented and explored as an extension of the current transaction. The portion 902 of the interactive user display 900 may be user selectable to trigger generation of a new quote for another product while taking advantage of the information already captured from the business-type classification data 320 of FIG. 3A and other data accessed as part of preparing the current quote, e.g., data newly entered or retrieved from the auxiliary data 115 of FIG. 1. Continuing with the current transaction to provide additional product provisioning opportunities can reduce overall workload on the system 100 of FIG. 1, thereby increasing computational efficiency and improving available communication bandwidth utilization.

Figure 10:
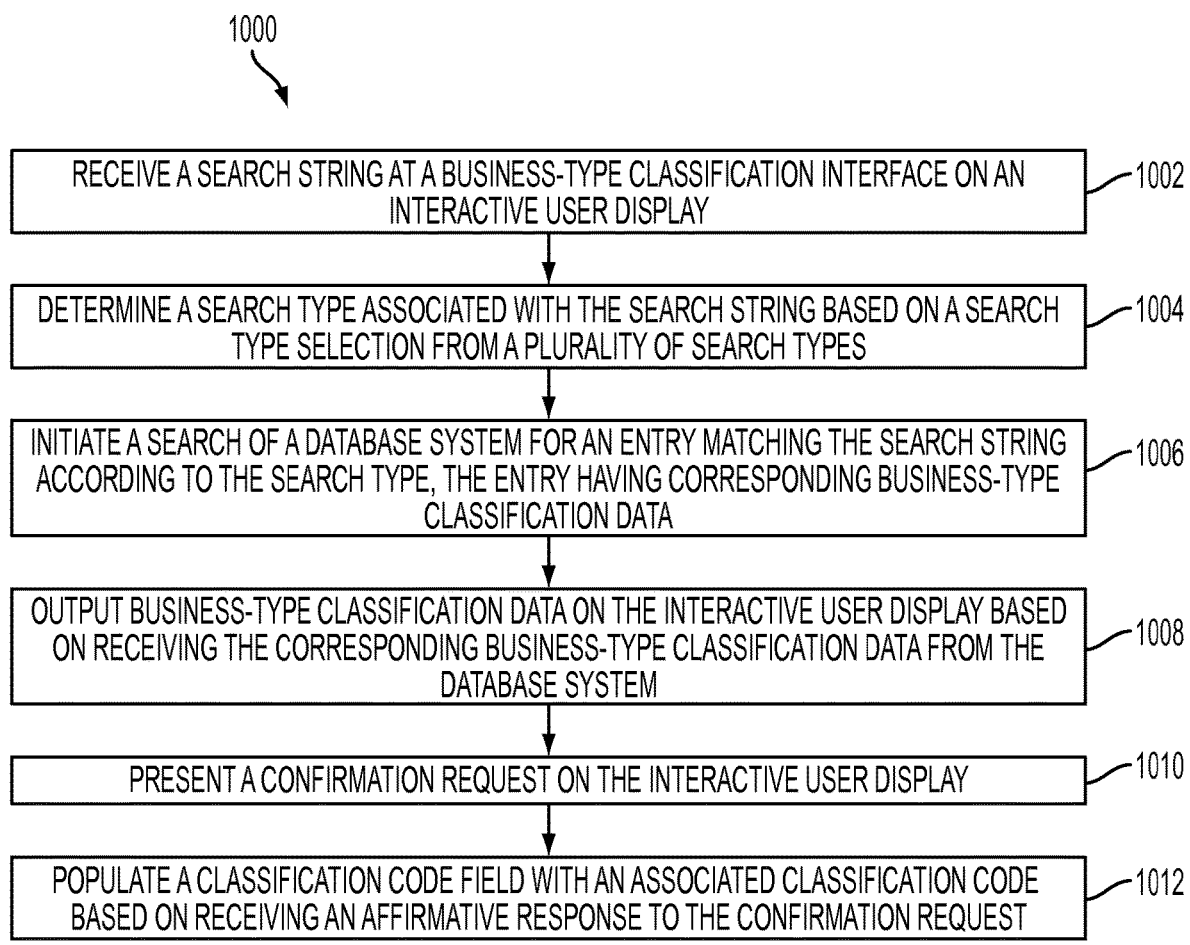
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the application server 102 of FIG. 1. In another embodiment, the process flow 1000 is performed by the user system 106 of FIG. 1.

At step 1002, a search string is received at a business-type classification interface on an interactive user display. For example, the search string can be received at the business type classification 408 of FIG. 4 or the search description input 506 of FIGS. 5A and 6. A specific input or number of inputs that are used to form the search string can vary depending upon search type.

At step 1004, a search type associated with the search string is determined based on a search type selection from a plurality of search types. The search type selection can be, for instance, a radio button type selection for the search type selection field 502 with a search type selected as one of the keyword search 510, industry segment search 512, SIC search 514, NAICS search 516, and program code search 518 of FIGS. 5A-5E. The search string can be the search description input 506 of FIG. 5A for the keyword search 510. The search string may be formed from the search input 526 as limited by the pull-down selection interface 522 of FIG. 5B for the industry segment search 512. Alternatively, the search string may be based on the SIC code search input 528 or the SIC division pull-down interface 530 of FIG. 5C for the SIC search 514. Further, the search string can be based on the NAICS code search input 532 or the NAICS industry pull-down interface 534 of FIG. 5D for the NAICS search 516. Additionally, the search string can be based on the program code input 536 of FIG. 5E for the program code search 518.

At step 1006, a search of a database is initiated for an entry matching the search string according to the search type, where the entry has corresponding business-type classification data. The business-type classification data can include at least: a brief classification description, an extended classification description, and an associated classification code. For example, a search of the database 111 of FIG. 1 can access the business-type classification code table 300 of FIG. 3A to find a row or entry 322 of the business-type classification data 320 including at least the brief classification description 312, the extended classification description 314, and associated classification code 324. Searching can also span across related tables such as the industry table 326, SIC table 328, NAICS table 330, and/or auxiliary table 350 of FIG. 3B.

At step 1008, business-type classification data, such as the brief classification description and the extended classification description, are output on the interactive user display based on receiving the corresponding business-type classification data from the database. For instance, the product navigator pane 602 of the interactive user display 600 can output the brief classification description 606 and the extended classification description 608 of FIG. 6, among other values, based on receiving the corresponding business-type classification data 320 of FIG. 3A from the database 111 of FIG. 1.

At step 1010, a confirmation request is presented on the interactive user display. The confirmation request can be formatted as the agree button 616 of confirmation request 614 on the product navigator pane 602 of the interactive user display 600 of FIG. 6. In an exemplary embodiment, a new search request option is also presented in combination with the confirmation request 614 as the search again button 618 of FIG. 6. The brief classification description 606, the extended classification description 610, and the search string for the search description input 506 from the interactive user display 600 of FIG. 6 are cleared, in addition to other values in the product navigator pane 602, based on receiving an affirmative response to the new search request option, such as a detected click of the search again button 618 of FIG. 6.

The business-type classification data 320 of FIG. 3A can also include a classification guide 316 defining classification separation examples between business types identified as being similar to a business type defined in the brief classification description 312 of FIG. 3A. The classification guide 316 can be formatted and output on the interactive user display 600 of FIG. 6 as classification guide 610 based on receiving the corresponding business-type classification data 320 of FIG. 3A from the database 111 of FIG. 1 and prior to receiving a response to the confirmation request 614.

At step 1012, a classification code field is populated with the associated classification code based on receiving an affirmative response to the confirmation request. For instance, the classification code field 704 may be populated with the associated classification code 324 of FIG. 3A based on receiving an affirmative response to the confirmation request 614 of FIG. 6, e.g., upon a detected click of the agree button 616 of FIG. 6.

Figure 11:
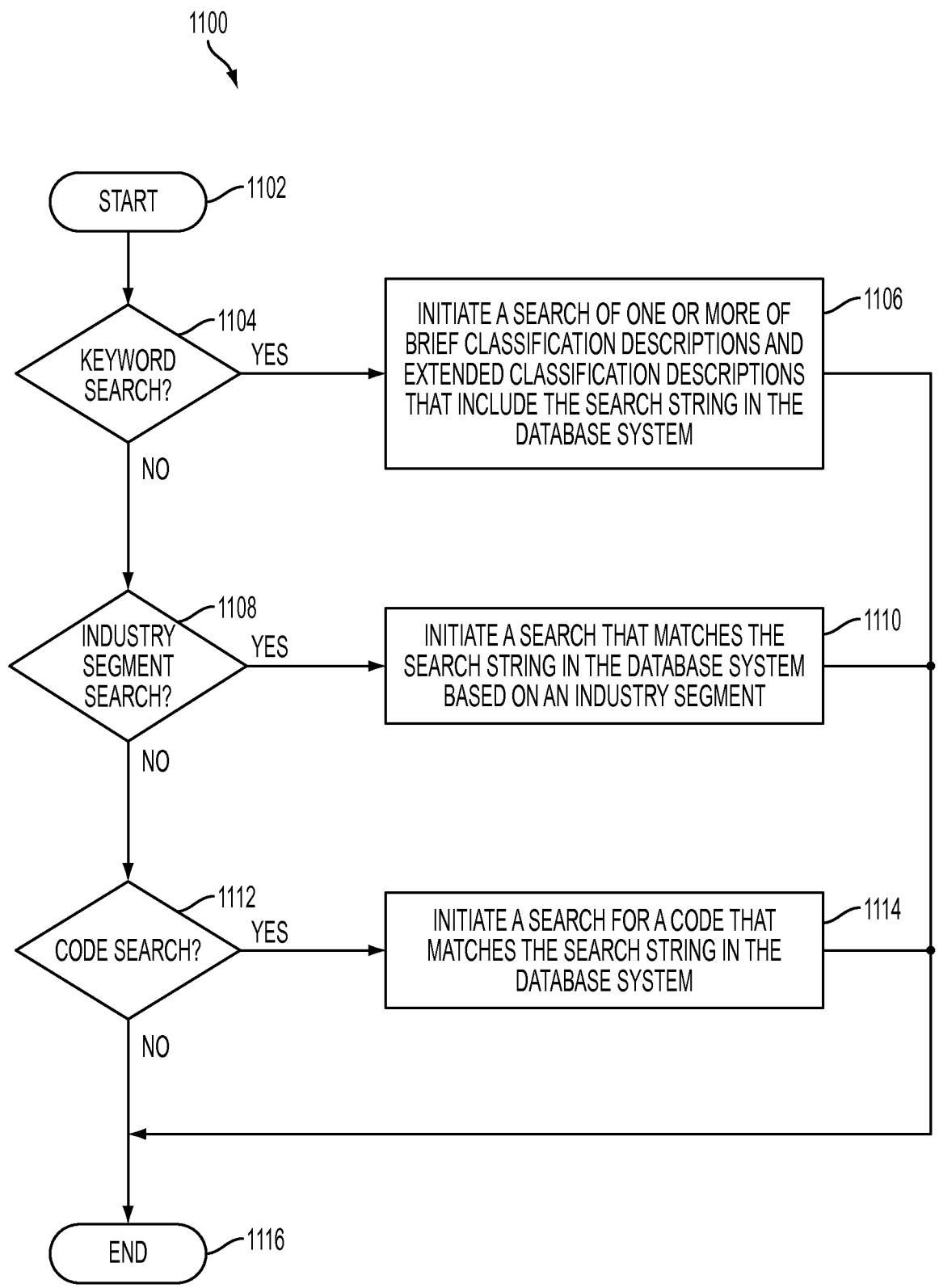
FIG. 11 depicts a process flow according to some embodiments of the present invention.

FIG. 11 depicts a process flow 1100 according to an embodiment. The process flow 1100 represents various search type options that may be implemented by the PN application 132 of FIG. 1. Process flow 1100 begins a block 1102. At step 1104, it is determined whether a search is initiated as a keyword search, such as the keyword search 510 of FIG. 5A. If the search is a keyword search, then at step 1106, a search is initiated of one or more of the brief classification descriptions 312 and the extended classification descriptions 314 of FIG. 3A that include the search string in the database 111 of FIG. 1. Otherwise, if the search is not a keyword search, then at step 1108, it is determined whether the search is initiated as an industry segment search, such as the industry segment search 512 of FIG. 5B. If the search is an industry segment search, then at step 1110, a search that matches the search string is initiated in the database 111 of FIG. 1 for one or more of the brief classification description 312 and the extended classification descriptions 314 of FIG. 3A using an industry segment constraint selected with respect to an industry segment description 334 or industry code 304 of FIG. 3A. In one example, a user may select an industry segment 520 on the user input interface 501B, then enter a keyword based on the industry segment 524. As discussed above, that search input 526 may be used as a search string against the brief classification description 312 and/or extended classification description 314 of FIG. 3A, as limited by the selected industry segment.

Otherwise, if the search is not an industry segment search, then at step 1112, it is determined whether the search is initiated as a code search. A code search can include, for instance, one of: a SIC search 514 of FIG. 5C for a SIC code 308 of FIG. 3A, a NAICS search 516 of FIG. 5D for a NAICS code 310 of FIG. 3A, and a numeric classification code search as a program code search 518 of FIG. 5E for a program code 306 of FIG. 3A. If the search is a code search, then at step 1114, a search is initiated for a code that matches the search string in the database 111 of FIG. 1. At block 1116, the process flow 1100 ends. It will be understood that additional search types can be included in the process flow 1100 and the steps need not be performed in the precise sequence as depicted in FIG. 11. For instance, steps 1104, 1108, and 1112 can be performed in any order or may be performed in parallel. Additionally, the searches can extend to other related numerical or text fields in various tables.

Figure 12:
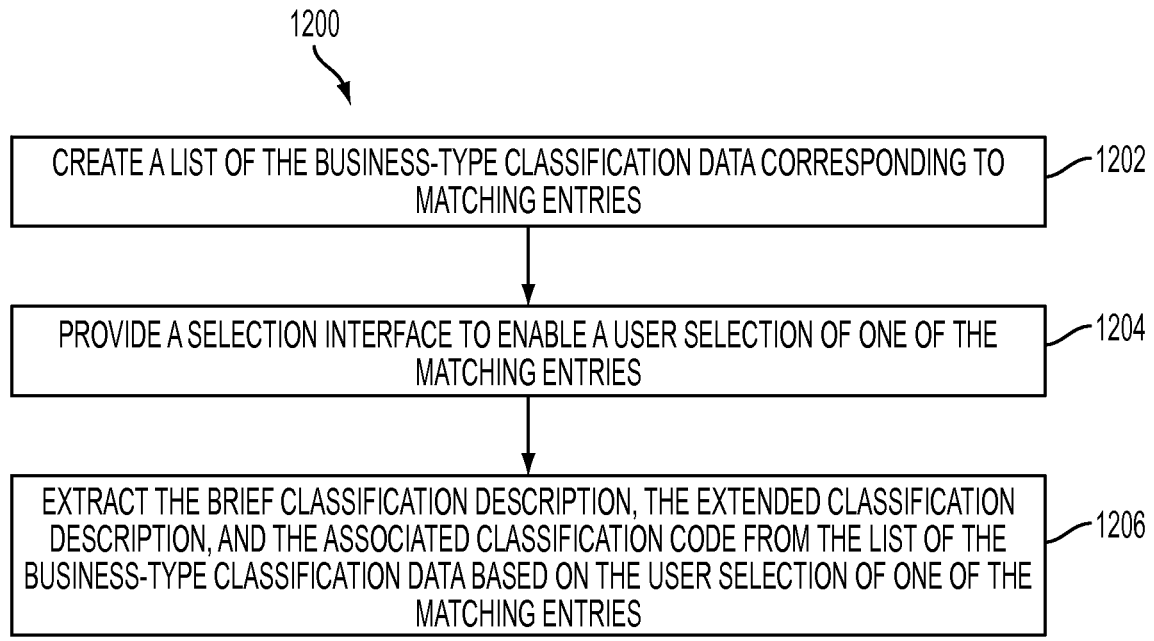
FIG. 12 depicts a process flow according to some embodiments of the present invention.

FIG. 12 depicts a process flow 1200 according to an embodiment. The process flow 1200 visually depicts steps that may be taken upon receiving multiple matching entries to a search query, e.g., multiple rows 322 of FIG. 3A matching a search string in the search description input 506 of FIG. 6 depending on the search type selected. At step 1202, a list of the business-type classification data is created corresponding to matching entries. The list itself may be retained in memory and not directly visible on the interactive user display 600 of FIG. 6 until further user actions are taken. At step 1204, a selection interface 620 is provided to enable a user selection of one of the matching entries as the business type classification 604 of FIG. 6. As previously described in reference to FIG. 6, the selection interface 620 can be a drop-down box that defaults to an alpha-numerically ordered first entry of the matching entries and displays additional entries of the matching entries in response to a user-initiated drop-down request. At step 1206, the brief classification description 606, the extended classification description 608, and the associated classification code 324 of FIG. 3A are extracted from the list of the business-type classification data based on the user selection of one of the matching entries. Other values corresponding to the selected entry can also be extracted for use, such as the classification guide 610 and account rounding opportunities 612 of FIG. 6.

Figure 13:
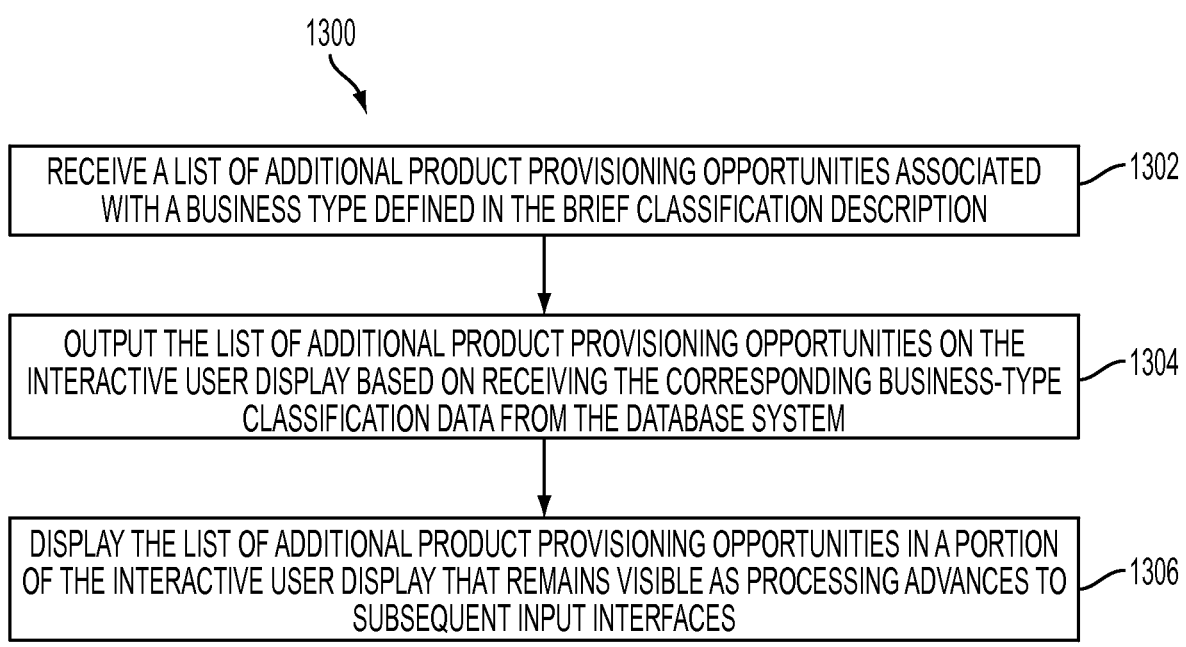
FIG. 13 depicts another process flow according to some embodiments of the present invention.

FIG. 13 depicts a process flow 1300 according to an embodiment. The process flow 1300 depicts an example of steps that may be performed with the additional product provisioning opportunities 318 of FIG. 3A. At step 1302, a list of additional product provisioning opportunities 318 of FIG. 3A associated with a business type defined in the brief classification description 312 is received in response to a search, for instance using the interactive user display 600 of FIG. 6. At step 1304, the list of additional product provisioning opportunities 318 of FIG. 3A is output on the interactive user display 600 as account rounding opportunities 612 of FIG. 6 based on receiving the corresponding business-type classification data 320 of FIG. 3A from the database 111 of FIG. 1. At step 1306, the list of additional product provisioning opportunities 318 of FIG. 3A output as account rounding opportunities 612 of FIG. 6 is displayed in a portion 902 of the interactive user display 900 of FIG. 9 that remains visible as processing advances to subsequent input interfaces.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a mediation layer gateway operable to provide an enterprise service bus that routes a plurality of communications within the system;
   a data storage system comprising a database;
   a query server comprising a query processor operable to access and index data in the database, the query server communicatively coupled to the mediation layer gateway; and
   an application server communicatively coupled to the mediation layer gateway, the application server comprising:
   a processing device; and
   a memory device in communication with the processing device, the memory device storing instructions that when executed by the processing device result in:

receiving a search string at a business-type classification interface on a first interactive user display generated by the application server;

populating a search description input of a second interactive user display with the search string received at the first interactive user display;

determining a search type associated with the search string based on a search type selection from a plurality of search types;

initiating a search of the database for an entry matching the search string according to the search type, the entry having corresponding business-type classification data comprising: a brief classification description, an extended classification description, and an associated classification code;

outputting the brief classification description and the extended classification description on the second interactive user display based on receiving the corresponding business-type classification data from the database, wherein the business-type classification data received in response to the search is retrieved from the database by the query processor and passed through the mediation layer gateway;

presenting a confirmation request on the second interactive user display; and populating a classification code field with the associated classification code on an extended version of the first interactive user display based on receiving an affirmative response to the confirmation request.

2. The system of claim 1, wherein the search is initiated as a keyword search of one or more of brief classification descriptions and extended classification descriptions that include the search string in the database based on determining that the requested search type is the keyword search.

3. The system of claim 1, wherein the search is initiated as an industry segment search that matches the search string in the database based on determining that the requested search type is the industry segment search.

4. The system of claim 1, wherein the search is initiated as a code search that matches the search string in the database based on determining that the requested search type is the code search.

5. The system of claim 4, wherein the code search comprises one of: a Standard Industry Classification (SIC) code search, a North American Industry Classification System (NAICS) code search, and a numeric classification code search.

6. The system of claim 1, further comprising instructions that when executed by the processing device result in:
based on multiple entries in the database matching the search string, creating a list of the business-type classification data corresponding to the matching entries;
providing a selection interface to enable a user selection of one of the matching entries; and
extracting the brief classification description, the extended classification description, and the associated classification code from the list of the business-type classification data based on the user selection of one of the matching entries.

7. The system of claim 6, wherein the selection interface is a drop-down box that defaults to an alpha-numerically ordered first entry of the matching entries and displays additional entries of the matching entries in response to a user-initiated drop-down request.

8. The system of claim 1, wherein the business-type classification data further comprises a classification guide defining classification separation examples between business types identified as being similar to a business type defined in the brief classification description.

9. The system of claim 8, further comprising instructions that when executed by the processing device result in:
outputting the classification guide on the second interactive user display based on receiving the corresponding business-type classification data from the database and prior to receiving a response to the confirmation request.

10. The system of claim 1, wherein the business-type classification data further comprises a list of additional product provisioning opportunities associated with a business type defined in the brief classification description.

11. The system of claim 10, further comprising instructions that when executed by the processing device result in:
outputting the list of additional product provisioning opportunities on the second interactive user display based on receiving the corresponding business-type classification data from the database.

12. The system of claim 11, wherein the list of additional product provisioning opportunities is displayed in a portion of another interactive user display that remains visible as processing advances to subsequent input interfaces.

13. The system of claim 1, further comprising instructions that when executed by the processing device result in:
presenting a new search request option in combination with the confirmation request; and
clearing the brief classification description, the extended classification description, and the search string from the second interactive user display based on receiving an affirmative response to the new search request option.

14. The system of claim 1, further comprising instructions that when executed by the processing device result in:
providing a visual command to launch the business-type classification interface, wherein the visual command is located on a portion of another interactive user display that remains visible as processing advances to subsequent input interfaces.

15. The system of claim 1, wherein the business-type classification interface supports type-ahead searching.

16. The system of claim 1, wherein the search of the database includes searching for one or more of: exact string matches, partial string matches, and synonym matches.

17. A computer program product comprising a storage medium embodied with computer program instructions that when executed by a computer cause the computer to implement:
receiving a search string at a business-type classification interface on a first interactive user display generated by an application server;
populating a search description input of a second interactive user display with the search string received at the first interactive user display;
determining a search type associated with the search string based on a search type selection from a plurality of search types;
initiating a search of a database for an entry matching the search string according to the search type, the entry having corresponding business-type classification data comprising: a brief classification description, an extended classification description, and an associated classification code;
outputting the brief classification description and the extended classification description on the second interactive user display based on receiving the corresponding business-type classification data from the database, wherein the business-type classification data received in response to the search is retrieved from the database by a query processor and passed through a mediation layer gateway, and the application server and the query server are communicatively coupled through the mediation layer gateway operable to provide an enterprise service bus that routes a plurality of communications;

presenting a confirmation request on the second interactive user display; and populating a classification code field with the associated classification code on an extended version of the first interactive user display based on receiving an affirmative response to the confirmation request.

18. The computer program product of claim 17, further comprising computer program instructions that when executed by the computer cause the computer to implement:

based on multiple entries in the database matching the search string, creating a list of the business-type classification data corresponding to the matching entries;

providing a selection interface to enable a user selection of one of the matching entries; and extracting the brief classification description, the extended classification description, and the associated classification code from the list of the business-type classification data based on the user selection of one of the matching entries.

19. The computer program product of claim 17, wherein the business-type classification data further comprises a classification guide defining classification separation examples between business types identified as being similar to a business type defined in the brief classification description.

20. The computer program product of claim 17, wherein the business-type classification data further comprises a list of additional product provisioning opportunities associated with a business type defined in the brief classification description.

21. The computer program product of claim 20, further comprising computer program instructions that when executed by the computer cause the computer to implement:

outputting the list of additional product provisioning opportunities on the second interactive user display based on receiving the corresponding business-type classification data from the database.

22. The computer program product of claim 17, further comprising computer program instructions that when executed by the computer cause the computer to implement:

presenting a new search request option in combination with the confirmation request; and clearing the brief classification description, the extended classification description, and the search string from the second interactive user display based on receiving an affirmative response to the new search request option.

23. The computer program product of claim 17, further comprising computer program instructions that when executed by the computer cause the computer to implement:

providing a visual command to launch the business-type classification interface, wherein the visual command is located on a portion of another interactive user display that remains visible as processing advances to subsequent input interfaces.

* * * * *